Normal test by Zellweger Ltd. Uster

AKIRA AOKI
INVENTOR.

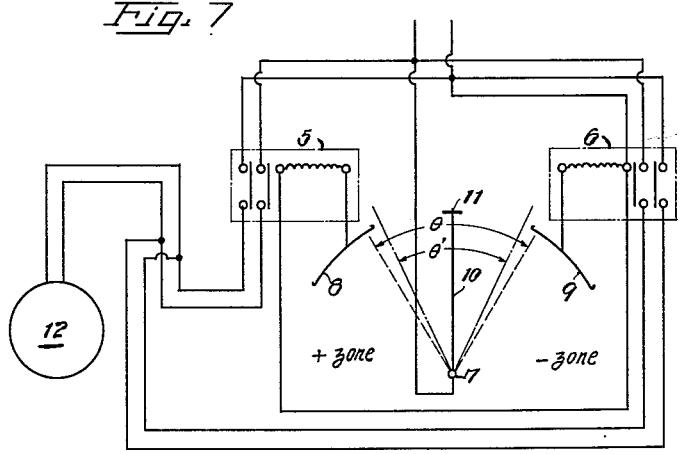
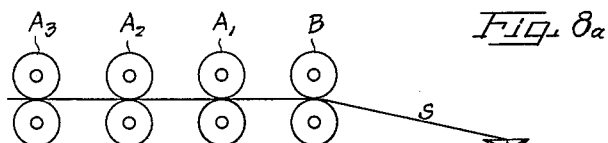
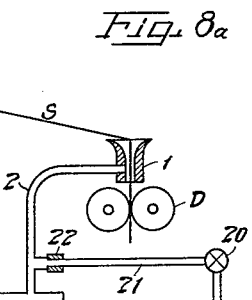
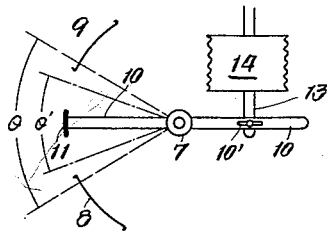
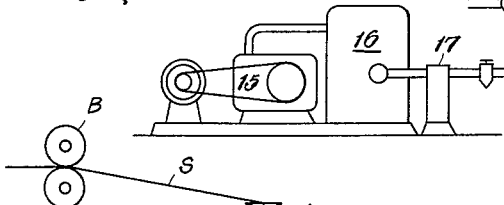
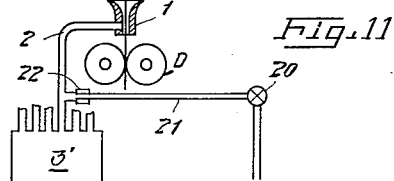

AKIRA AOKI
INVENTOR
BY Wenderoth, Lind & Ponack
ATTORNEYS

United States Patent Office 3,088,175
Patented May 7, 1963

3,088,175
AUTOMATIC LEVEL CONTROL SYSTEM FOR
PRODUCT SLIVER WEIGHT
Akira Aoki, 1–94 Ohmino 6-ku, Tomioka-cho, Higashi
Sumiyoshi-ku, Osaka, Japan
Filed Jan. 10, 1958, Ser. No. 708,264
2 Claims. (Cl. 19—240)

This invention relates to new and useful improvements in an automatic level control system for product sliver weight. For the control of product sliver counts in cotton and rayon spinning, the so-called quality control system is applied. At the present stage the X-R chart system is widely used for the control of product sliver counts in a drawing operation. In this case, however, the causes of getting out of control are in most cases not clear, so the common operation to maintain the spinning level is to change the draft change gear according to the information from the X-R chart. This operation does not mean the elimination of the so-called assignable cause but merely means the adjusting of the spinning level. Therefore, over-action due to misjudgment of control chart as well as misaction due to sampling error could not be avoided.

Now, if we desire to control correctly the weight of product sliver, it will be useful to increase the frequency of sampling. In extremity, the sampling interval will be zero. It means 100% sampling or screening. In this case all the product will be consumed for weighing. However, if it will be possible to measure the thickness of sliver which corresponds to the fiber density in cross sectional area of the product sliver by some electronic means, mechanical means or pneumatic means and to change the draft percentage according to variance from the standard spinning level, this kind of control method will truly be an automatic level control system for product sliver weight.

The characteristic features, objects and advantages of this invention will become more apparent from the following description made with reference to the accompanying drawings.

In the drawings:

FIG. 7 is a circuit diagram of the control for the drafting roll drive;

FIG. 8a is a diagrammatic view of the entire sensing system according to the present invention;

FIG. 8b is an enlarged diagrammatic view of a portion of FIG. 8a;

FIG. 11 is a diagrammatic view of a modification of the sliver sensing means according to the present invention.

Figure 1:
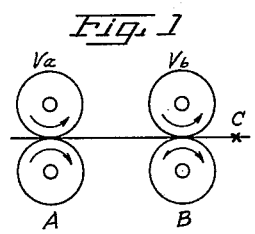
FIG. 1 is a diagrammatic view of two pairs of drafting rolls.

In the draft unit shown in FIG. 1 of the accompanying drawings wherein $V_a$ is the surface speed of feed roller A, $V_b$ surface speed of delivery roller B, and C the sensing point, the surface speed $V_a$ or $V_b$ in the feed back control system is changed according to the variation of the sliver weight from the standard spinning level.

In this feed back system we must consider the time constant of the sensing device, controller and controlled plant as well as the disturbance caused by the variation of feed sliver's thickness and the noise caused by draft. Therefore a special device to maintain stability of control and ability of control in the control system will be necessary.

Figure 2:
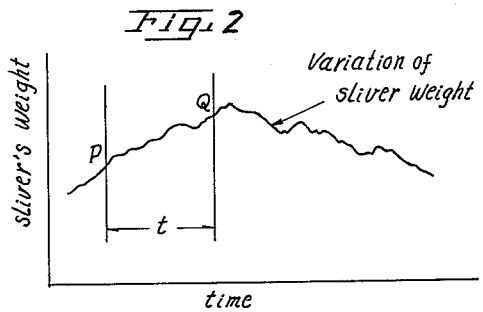
FIG. 2 is a graph showing variation in sliver weight over a period of time.

FIG. 2 shows an example of variation of sliver weight which corresponds to the fiber density in the cross sectional area of the sliver. In this figure, P and Q are arbitrary time points and $t$ the time lag of point Q to point P. Now by indicating increase in the trend of variation of sliver weight as ($+$) and decrease ($-$) it would be possible to calculate the correlation coefficient $r$ of the sign of variation of sliver weight as a function of time lag $t$.

Figure 3:
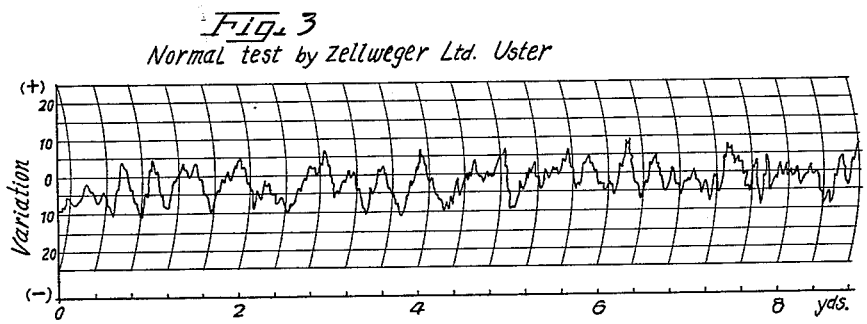
FIG. 3 is a sample Uster diagram for a sliver.

FIG. 3 shows an example of a sliver Uster diagram of sliver. For this variation, the short term variation may be eliminated by use of the moving average. By "moving average" is meant the average weight of a length of sliver which moves past a fixed point in a given time. It is known, as evidenced by the diagram shown in FIG. 12 that the frequency of variations of sliver weight is very high. The time over which the average is taken is long enough for several individual changes in weight to take place, but is relatively short compared to the time in which the entire sliver takes to pass the point in question. The average thus varies substantially continually.

Figure 4:
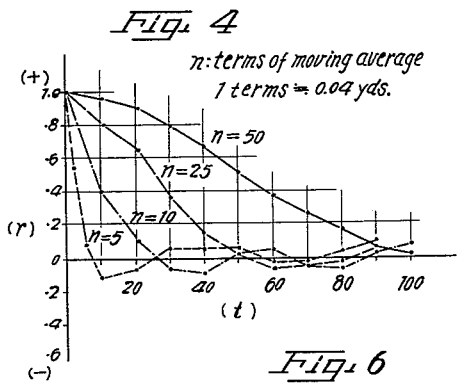
FIG. 4 is a graph of correlation coefficient vs. time for a series of moving averages.

FIG. 4 shows the correlogram in respect to $r$ and $t$ and the term of moving average $n$, as applied to the foregoing example in FIG. 3. From the information given in FIG. 4, it can be clearly said that the wider the range of moving average the wider the range of time lag $t$ which shows the statistically significant value of $r$. Therefore this indicates the possibility of estimating the input in draft control by the feed back system, and also it will lessen the error due to mischange of draft resulting from time lag of the control action.

Figure 5:
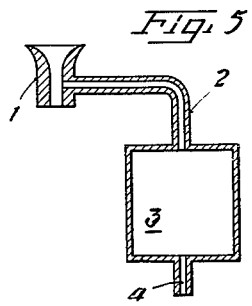
FIG. 5 is a diagrammatic view of a means for sensing moving average.

FIG. 5 shows an example of a system for determining moving average in which applied to the sensing device is an air micrometer. In this figure, air tank 3 connects to air tubes 2 and 4, and the capacity of said tank 3 is readily changeable. The action of this air tank 3 is just like a condenser tube; in other words, it smooths out the output of the air micrometer nozzle. Hence the output of tank 3 is the moving average of the output of air micrometer nozzle 1.

However, stability of control will not be satisfactory with this feed back draft control system with the moving average apparatus, because of the time lag of the control action. In other words, it will not be possible to avoid the hunting of draft change in this system, which can be noted from the statistical information in FIG. 4.

Figure 6:
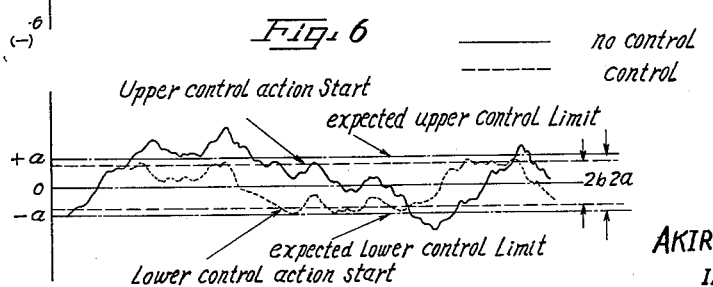
FIG. 6 is a graph of moving average vs. time showing the limits at which control starts.

FIG. 6 shows the fundamental idea for securing control stability. The desired weight of the sliver is represented by the O line. On either side of this line is a neutral zone within which no control is exercised. The range of this neutral zone is $2b$ which consists of an upper limit and lower limit at the position $b$ on both sides of the center line. The control action starts at this upper and lower control limit, and the range of this neutral zone should be adjusted according to the type of sliver desired. Actual control action operates as follows: If the input reaches the control limit, the output of the sensing device is transmitted to the controller through a transfer device, and after the constant time lag the control action will start. It will therefore be impossible to control the level of the product sliver inside the neutral zone. Actually, the control range of the level of weight of the product sliver is wider than that of the neutral zone. In this figure the actual control range is indicated by the upper and lower expected control limit. This range 2a is wider than 2b. The relation of 2a and 2b will be determinable by the statistical information of input variation and by the transference and time constant of this automatic control system. By means of this neutral zone system in the feed back draft control system, control stability will be maintained.

This neutral zone system like the moving average system forms a basis for satisfactorily effecting automatic control of weight level of product sliver.

FIG. 8a shows an example of automatic level control system for a 4 roll drafting system. In this figure, $A_1$ indicates the 2nd roller, $A_2$ the 3rd roller, $A_3$ the back roller, B the delivery roller, S the product sliver, 1 the air micrometer nozzle, and D the calender roller. A compressor 15 pumps air into high pressure air tank 16 from whence air passes through air cleaner 17 to air tank 18. Pressure in tank 18 remains constant and is fed through constant pressure valves 19 and 20 and pipe 21 to pressure adjusting valve 22. Pipe 2 joins the air micrometer nozzle 1 to a moving average air tank 3, and pressure adjusting valve 22 joins pipe 2. Pivoted rod 10 is oscillated around pivot 7 by the movement of rod 13 which is moved by bellows 14 to which moving average air tank 3 is connected. Rod 10 has a slit 10′ therein so that the pin on the end of rod 13 may slide freely in the slit.

FIG. 8b shows on an enlarged scale bellows 14, connecting rod 13, rod 10 and contacts 8, 9 of the neutral zone circuit which is shown in FIG. 7.

In operation, air compressed by compressor 15 is purified by air cleaner 17 and its pressure is stabilized by high pressure air tank 16 and connecting tank 18, and a constant pressure of air is obtained by conventional constant pressure valves 19 and 20. The air passes through valve 20, connecting pipe 21 and pressure adjusting valve 22, and is divided so as to move in two directions, i.e. to nozzle 1 which forms the air micrometer and to tank 3 of a moving average determining means and bellows 14. The nozzle 1 is of special construction, i.e. the air inlet of nozzle 1 is perpendicular to the path of the sliver and the pressure in pipe 2 is elevated by the sliver in passing through nozzle 1. The variation of pressure is proportionate to the variation of thickness of sliver which passes through nozzle 1 and may be varied by a suitable setting of valve 22. Therefore the variation of pressure which corresponds to the variation of thickness of sliver passing through nozzle 1 is transformed approximately to the value of the moving average by tank 3. The value of this moving average causes a variation of pressure in bellows 14. The expansion and contraction of bellows 14 is thus governed by the output of tank 3, and the value of this deformation of bellows 14 is proportional to the value of the output of tank 3.

The role of tank 3 in producing an output proportional to the moving average has been explained above, but an explanation concerning the effect of the capacity of tank 3 is necessary. A change in capacity of said tank will produce a change in the range of the moving average, i.e. the lager the capacity of the tank the smoother will be the transmission of the output of the tank to bellows 14.

Figure 9:
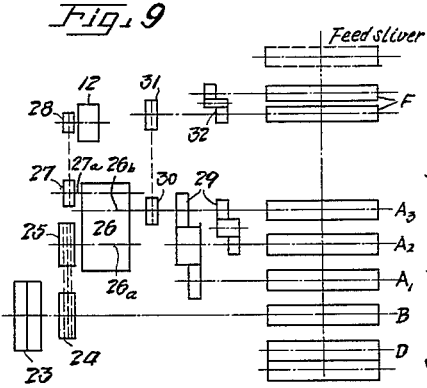
FIG. 9 is a diagrammatic layout of a drafting mechanism with a control system according to the present invention.

The deformation of bellows 14 oscillates rod 10 around the center of oscillation 7. The front end of rod 10 completes the electric circuit through one of two electrodes (see FIG. 7) the distance between these electrodes corresponding to the angle of oscillation of rod 10, i.e. $\theta'$. In FIG. 7, rod 10 oscillates around the pivot 7 as a result of the output of the sensing device. If the front end 11 of rod 10 comes in contact with contact 8, the electric circuit of switch 5 is closed and the output of the sensing device is transmitted to the pilot motor 12 as (+) and draft control action to increase the product sliver weight, which is explained in connection with FIG. 9, is initiated. If end 11 contacts the contact 9, the opposite output (—) is transmitted to the pilot motor 12 and draft control action to decrease the product sliver weight, which is explained in connection with FIG. 9, is initiated. The pilot motor 12 will not operate as long as the front end 11 of rod 10 does not come in contact with contacts 8 and 9. Therefore, the neutral zone described with reference to FIG. 6 corresponds to the angle of oscillation $\theta'$.

FIG. 9 shows a plan for the control apparatus and the controlled plant. In this figure, $A_1$ is the 2nd roller, $A_2$ the 3rd roller, $A_3$ the back roller, B the delivery roller, D the calender roller, while 23 is a fast and loose pulley on a main shaft, 24 and 25 are pulleys on sheaves. 27 and 28 are pulleys or sheaves or sprocket wheels, and 12 is the pilot motor. A variable speed drive 26 is provided having input shaft 26a, output shaft 26b and control shaft 27a on which pulley 27 is mounted. The rotating speed of input shaft 26a which is driven through pulleys 23, 24 and 25, is a constant speed, but the rotating speed of output shaft 26b is varied from that of input shaft 26a by means of the action of pulley 27 through pulley 28 which action is directed by pilot motor 12. In other words, the pilot motor 12 serves to adjust the ratio of rotating speed between input shaft 26a and output shaft 26b of the variable speed drive 26 to control the product sliver weight. The transmission of rotation between pulley 24 and pulleys 25, 27 and 28, 30 and 31 is performed by chain drives or belt drives. The variable speed drive is a conventional type, so the rotation of pulley 27 changes the ratio of rotating speed between the input shaft 26a and output shaft 26b of the variable speed drive. Pulleys, sheaves or sprocket wheels 30, 31 and gears 32 are connected to drive the feed rollers F, and gears 29 are connected to drive rollers $A_1$–$A_3$. Therefore the surface speed of delivery roller B, roller B being driven from the main shaft, is constant and that of $A_1$, $A_2$, $A_3$ and F is changed at the same ratio by the action of pilot motor 12.

The (+) direction of control action means increasing the product sliver weight and the (—) direction of control action means decreasing the product sliver weight. The (+) or (—) direction of control action is performed by the following control system.

When pilot motor 12 rotates in the (+) direction, control shaft 27a of variable speed drive 26 rotates in the (+) direction, being driven through sprocket wheels 27, 28 by the chain drive of pilot motor 12, the output of variable speed drive 26 is increased in the (+) direction; in other words, the rotating speed of the output shaft 26b of variable speed drive 26 increases at a constantly changing ratio, which ratio should be designed at the initial stage of designing this control equipment, to the constant rotating speed of input shaft 26a of variable speed drive 26. By this operation, the rotating speeds of roller $A_1$, $A_2$, $A_3$ and F are increased at the same constantly changing ratio as that of output shaft 26b of variable speed drive 26. Since the rotating speed of roller B is constant, the draft ratio between the roller $A_1$ and B decreases, the weight of produced sliver S continues to increase up to the breaking of the electric circuit which is described in connection with FIG. 7 and FIG. 8b. By this control operation, the average weight of produced sliver is controlled inside the expected lower control limit which is described in connection with FIG. 6.

On the contrary, if the weight of produced sliver should reach the starting limit of upper control action which is described in connection with FIG. 6, i.e. if the end 11 of rod 10 touches contact 9, the output of the electric circuit is in the (—) direction. Therefore the pilot motor 12 rotates in the (—) direction, and the opposite control action is performed in the same manner as the control action in the (+) direction. By this control action the draft ratio between roller $A_1$ and B is increased, and the weight of produced sliver S continues to decrease up to the breaking of the electric circuit of FIG. 7 and FIG. 8b. By this control operation, the average weight of produced sliver is controlled inside the expected upper control limit which is described in connection with FIG. 6.

Figure 10:
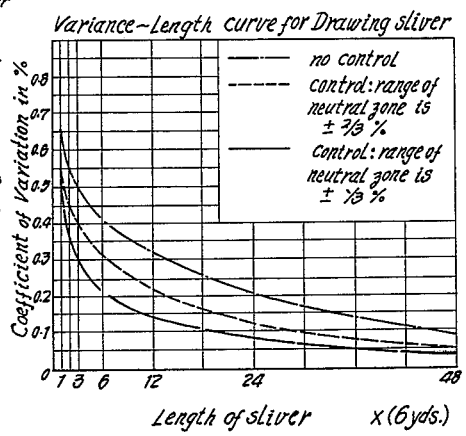
FIG. 10 is a graph of the coefficient of variation in percent vs. the length of sliver for various control conditions.

FIG. 10 shows the variance length curve of product sliver weight. One can readily recognize the excellent control effect by this automatic control system. This example was taken on the product sliver from No. 2 drawing frame, and is the result of test on one delivery.

In the present operation of cotton and rayon spinning, control of only sliver on a frame will not be wanted for economical reasons. As explained previously, the statistical quality control system is being applied at the present stage. For this reason, automatic control for the average counts of product sliver of a drawing frame will be useful to the quality control program of mills. For this purpose a single automatic average apparatus for the output of all delivery rollers on an entire frame is desirable. FIG. 11 shows an example of this equipment. In this figure, air tank 3' performs the automatic transference of the moving average and average of output of each sliver delivery by the frame. The position for installing this air tank is the same as the position of air tank 3 in FIG. 8.

Figure 12:
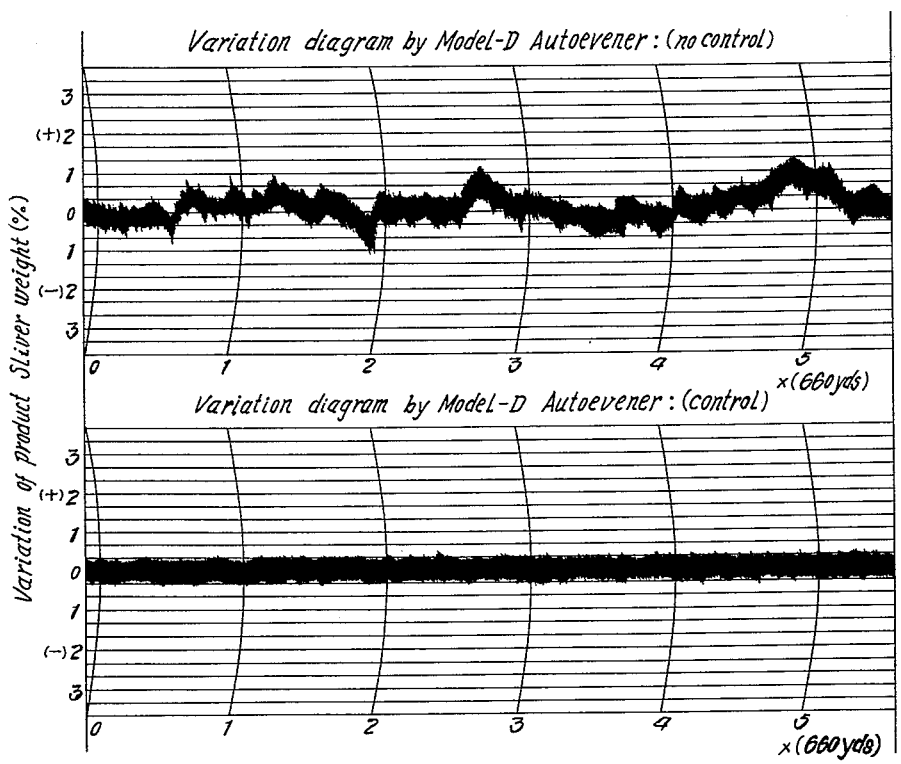
FIG. 12 is a graph of sliver weight in percent vs. length of sliver for a no control and a control condition respectively.

FIG. 12 is an example showing results obtained by this automatic control system.

As described above, the present invention is an automatic control system for product sliver weight by use of a feed back system characterized in that, taking into consideration the time constant, the disturbance caused by the variation of feed sliver thickness and noise caused by draft, it effects automatic control by leaving variation such as inch units as they are and adjusting automatically medium or larger variation, for example over ½ yd. while confirming the control effects thereof. Not only is this invention altogether different in its way of thinking from heretofore known level adjusting methods by open circuit, but it is a useful invention that is entirely new in its mechanism, easy to operate and effective.

What I claim is:

1. Apparatus for controlling product sliver weight produced by a multi-roll drafting mechanism having feed rolls, intermediate rolls and delivery rolls and having a variable speed driving means driving the feed rolls and intermediate rolls of said drafting mechanism, comprising a sensing means on the delivery side of the drafting mechanism for continually sensing the product sliver weight, means for averaging the output of said sensing means, said means being connected to said sensing means, an off-on control having two on positions and an off position therebetween, and a control means connected to the variable speed driving means for the drafting mechanism, said off-on control being connected to said control means for causing said control means to increase the speed of the variable speed driving means when the off-on control is in one on position and to decrease the speed of the variable speed driving means when the off-on control is in the other on position, said off-on control being connected to said means for averaging and being actuated by said means to one of the on positions when the variation of the averaged output of the sensing means from a predetermined average sliver product weight is an amount greater than a predetermined amount.

2. Apparatus for controlling product sliver weight produced by drafting rolls comprised of feed rolls, intermediate rolls and delivery rolls and having a variable speed driving mechanism driving said feed rolls and intermediate rolls, said apparatus comprising an air micrometer on the delivery side of said drafting rolls, an air tank to which said air micrometer is connected, a source of constant pressure air connected to said air micrometer and to said tank, a bellows connected to said tank, a pivoted arm one end of which is actuated by said bellows, two contacts spaced from each other on opposite sides of a middle position of the other end of said pivoted arm, an electric motor controlling the speed of the variable speed driving mechanism, and two electric circuits, one of which contains one of said two contacts and said arm and energizing said electric motor to drive it in one direction, and the other of which contains the other of said two contacts and said arm and energizes said electric motor to drive it in the other direction.

References Cited in the file of this patent

UNITED STATES PATENTS

| | | |
|---|---|---|
| 2,205,304 | Mutter | June 18, 1940 |
| 2,361,217 | Lewis | Oct. 24, 1944 |
| 2,407,100 | Richardson | Sept. 3, 1946 |
| 2,805,449 | Martin | Sept. 10, 1957 |
| 2,843,882 | Lewis et al. | July 22, 1958 |
| 2,950,508 | Locher | Aug. 30, 1960 |